United States Patent [19]

Wilson

[11] 4,149,434
[45] Apr. 17, 1979

[54] SCREW AND SCREWDRIVER THEREFOR

[76] Inventor: Leroy Wilson, P.O. Box 203, Manhattan, Kans. 66502

[21] Appl. No.: 887,473

[22] Filed: Mar. 17, 1978

[51] Int. Cl.² .................. B25B 13/48; F16B 31/02
[52] U.S. Cl. .................................. 81/71; 85/9 R; 85/45; 85/61; 145/50 A
[58] Field of Search .......... 85/61, 62, 45, 9 R; 145/50 A, 50 D; 81/71

[56] References Cited

U.S. PATENT DOCUMENTS

| | | | |
|---|---|---|---|
| 1,397,876 | 11/1921 | Meldal | 85/9 R X |
| 2,394,104 | 2/1946 | Rankin | 85/45 |
| 2,660,083 | 11/1953 | Tyson | 85/9 R |
| 2,813,450 | 11/1957 | Dzus | 85/45 |
| 3,449,988 | 6/1969 | Gallo | 145/50 A X |
| 3,800,841 | 4/1974 | Lindberg | 145/50 A X |
| 3,865,007 | 2/1975 | Stanback | 85/61 |
| 3,963,322 | 6/1976 | Gryctko | 85/61 X |

FOREIGN PATENT DOCUMENTS

| | | | |
|---|---|---|---|
| 954633 | 12/1949 | France | 145/50 A |
| 463313 | 4/1951 | Italy | 85/45 |

Primary Examiner—Rodney H. Bonck
Attorney, Agent, or Firm—John A. Hamilton

[57] ABSTRACT

A screw having an annular socket formed concentrically in the outer surface of its head, with at least a pair of radial walls in said socket, and adapted to be used with a pair of special tubular drivers adapted to be inserted coaxially into said socket and having its side walls transversely slotted to engage over the radial walls, one of the drivers being of a diameter to engage weakened portions of the walls, which by breaking out, limit the torque applicable to set the screw, and the other of the drivers being of a diameter to engage stronger portions of the radial walls for applying greater torque to remove the screw. Both drivers are capable of frictionally gripping and holding the screw for convenience of inserting or removing the screw into or from positions of difficult access.

3 Claims, 8 Drawing Figures

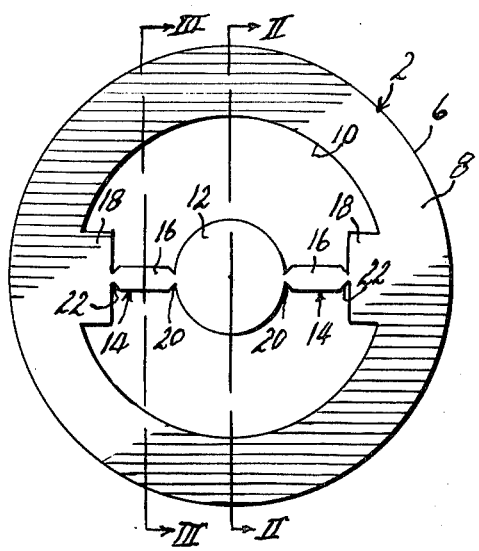
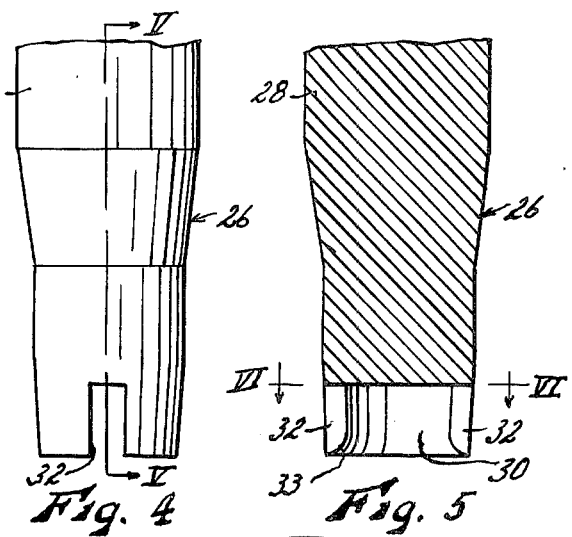
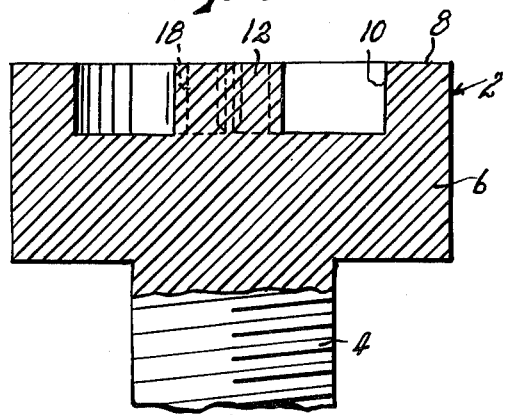
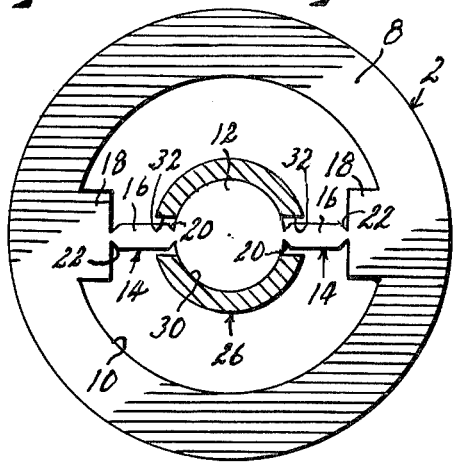
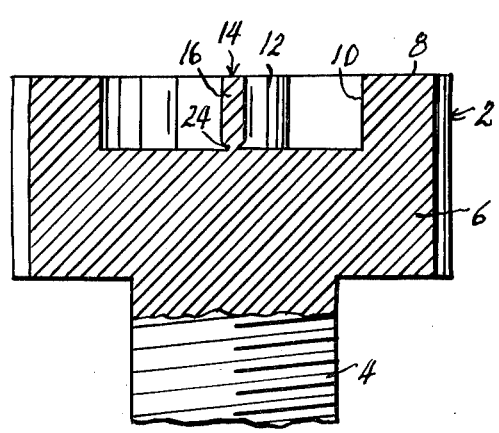
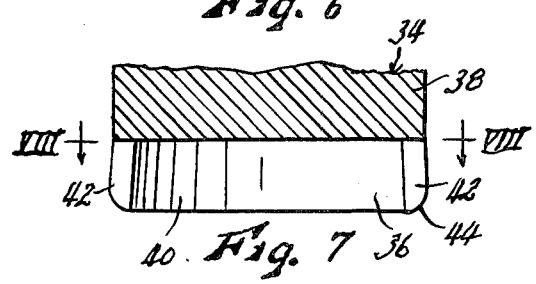
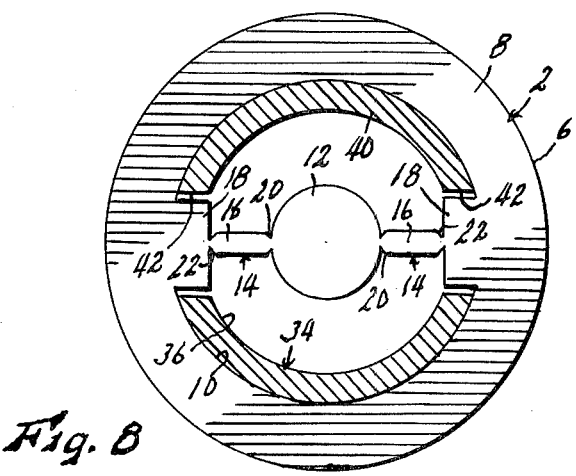

SCREW AND SCREWDRIVER THEREFOR

This invention relates to new and useful improvements in screws and screw drivers.

An important object of the present invention is the provision of a specially configured screw, and matching screw driver, whereby the torque with which said screw may be set is automatically limited. Generally, this object is accomplished by providing an annular socket concentrically in the outer end of the screw head, in which are provided a pair of radial walls disposed diametrically to the socket, and a screw driver insertable coaxially into the socket and having a diametrical slot for engaging over said walls, whereby torque applied to the driver is applied to the screw through said walls. Portions of the walls may be necked or otherwise weakened to any desired degree whereby they will fracture or break out whenever torque in excess of a predetermined amount is applied thereto.

Another object is the provision of a screw and driver of the character described having means tamper-proofing it to a considerable degree, while still permitting removal thereof when desired. That is the breaking out of the weakened portions of the radial walls prevents removal of the screw by the driver by which it was set, since the screw no longer has walls to which the driver could apply the necessary reverse torque, but the walls may also be provided with thicker, stronger, non-breakable portions, at different spacings from the screw axis than the weakened portions, and a special removal driver provided which is proportioned to engage the thicker wall portions. If a still greater degree of tamper-proofing is desired, the thicker wall portions may be omitted.

A further object is the provision of a screw and driver of the character described in which the driver is capable of frictionally gripping and holding the screw in fixed relation thereto, as a convenience and aid in inserting the screw into, or removing it from, positions to which full access is difficult or impossible.

Other objects are simplicity and economy of construction, and efficiency and dependability of operation.

With these objects in view, as well as other objects which will appear in the course of the specification, reference will be had to the accompanying drawing, wherein:

FIG. 1 is an outer end view of the head of a screw embodying the present invention looking in a direction parallel to the axis of the screw, FIG. 2 is a fragmentary sectional view taken on line II—II of FIG. 1, FIG. 3 is a fragmentary sectional view taken on line III—III of FIG. 1, FIG. 4 is a fragmentary side elevational view of a screw driver embodying the present invention, and operable to set the screw shown in FIGS. 1-3.

FIG. 5 is a sectional view taken on line V—V of FIG. 4,

FIG. 6 is a sectional view taken on line VI—VI of FIG. 5, showing the driver operatively applied to a screw as shown in FIG. 1, FIG. 7 is a view similar to FIG. 5, but showing a driver operable to remove a screw as shown in FIGS. 1-3, and FIG. 8 is a sectional view taken on line VIII—VIII of FIG. 7, showing the removal driver operatively applied to a screw as shown in FIG. 1.

Like reference numerals apply to similar parts throughout the several views, and the numeral 2 applies generally to a cap screw principally of ordinary design, having a threaded shank 4 and a circular head 6 coaxial with said shank. The outer end surface 8 of head 6 is planar and is disposed normally to the screw axis. In accordance with the present invention, a socket 10 is formed in end surface 8. Said socket is circular, concentric with the screw axis, and is generally annular in form, leaving a cylindrical center post 12 and a pair of diametrically disposed radial walls 14 extending from said center post to the outer wall of the socket. All of these elements are of one-piece, integral form.

The inner portion 16 of each wall 14, closest to center post 12, is relatively thin normally to its radial extent, while its outer portion 18, closest to the outer periphery of socket 10, is relatively much thicker and stronger. Certain marginal edges of the thinner wall portions 16 are necked or otherwise weakened, for example at 20 along their lines of connection to center post 12, at 22 along their lines of connection to thicker outer wall portions 18, and at 24 along their lines of connection to the floor of socket 10. Weakening along all of these edges may not be necessary in some instances.

A special screw driver 26 for setting the screw 2 is shown fragmentarily in FIGS. 4-6. The shank 28 of said driver, which may be turned about its axis either manually or by power means, has a generally cylindrical socket 30 formed concentrically in the end thereof, and has diametrically opposite slots 32 formed in the shank wall surrounding said socket. Socket 30 is originally formed with a size to fit slidably over center post 12 of the screw when the driver shank is inserted into screw socket 10, and the shank walls at the opposite sides of its slots 32 are then angled slightly inwardly toward the open end of the socket, as shown in FIGS. 4 and 5. Thus when the driver is applied over the center post 12, there is an interference fit, and the center post springs the driver walls adjacent slots 32 thereof slightly apart, the driver material being sufficiently resilient for this purpose, and the mouth of socket 32 is internally rounded as indicated at 33 to facilitate application of the driver to the post. The width of slots 32 is sufficiently wide that the slots bridge the thinner inner end portions 16 of walls 14 when the driver is thus applied to the screw, and the external diameter of the shank at socket 30 is sufficiently small that slots 32 cannot engage the thicker outer portions 18 of walls 14.

Thus, in operation, it will be seen that in the setting of a screw, the screw may if desired be applied to the driver 26 by inserting the screw center post 12 into driver socket 30, as just described. The driver will then hold the screw firmly in a fixed relation thereto, and the driver may then be used as a tool to insert the screw into positions which are otherwise very difficult to reach. The driver is then turned on its axis to thread the screw into its associated work-piece, and then turned with a greater torque to provide final setting of the screw. The torque is of course applied to the thinner portions 16 of screw walls 14, and when the torque reaches and exceeds the pre-determined strength of walls 16, said walls fracture and break free from the remainder of the screw. During all turning of the screw, the engagement of driver socket 30 around center post 12 of the screw keeps the driver in centered relation to the screw. The breaking out of wall portions 16 thus provides a torque-limitation function which is very important in many screw applications, and provides it in a simple, effective and economical manner, since after said walls break free, driver 26 turns on center post 12 while applying at most only a negligible degree of torque thereto.

The screw, once set, may be loosened and removed by a special driver 34 shown in FIGS. 7 and 8. This driver is essentially the same as setting driver 26, having a socket 36 formed in the end of its shank 38, with the shank wall 40 surrounding the socket having diametrically opposite slots 42 formed therein. However, in this case the external diameter of wall 40 is normally such as to engage slidable into the outer periphery of screw socket 10, is angled slightly outwardly at opposite sides of slots 42 to be inserted frictionally into said socket, and is externally and peripherally rounded as indicated at 44 to facilitate the insertion. In use, wall 40 is inserted coaxially into screw socket 10 as shown in FIG. 8, with slots 42 of said wall bridging the thicker outer portions 18 of screw walls 14. The driver may then be turned in a direction to loosen and remove the screw, and wall sections 18 are so thick and strong that they will not break out, but can sustain almost any degree of torque which can be applied thereto by the driver. The outward springing of driver wall 40 provides that this driver will also "hold" the screw after it has been separated from its work piece.

In futher regard to the tamper-proofing feature of this invention, it will be appreciated that a substantial degree of this type of protection is derived from the fact that once the screw has been set by driver 26 and wall sections 16 broken out, its removal requires a separate and special tool, namely driver 34, which normally would not be available to unauthorized persons. As a matter of fact even driver 26 is of course also a special tool, and should not be available to unauthorized persons. However, if a still greater degree of tamper-proofing is desired, the thicker portions 18 of walls 14 could be eliminated, and the thinner portions 16 extended all the way to the outer periphery of screw socket 10, and joined thereto by neck 22. In this case, after walls 16 were broken out by torque applied thereto by the setting driver, the screw could not be removed by either of the drivers shown, removal then requiring some tool for cutting or otherwise deforming the screw head for accepting a further special wrench or the like. It will of course be noted that the screw could be tightened and set by the use of driver 34, as well as by driver 26, if the torque-limitation function were deemed unnecessary in any particular usage. The use of only two walls 14 in screw socket 10 is not a limiting factor. A greater number of walls could be used if found necessary or desirable, although they should in any event be spaced regularly about the periphery of the socket to balance the torque load applied thereby to the screw.

While I have shown and described a specific embodiment of my invention, it will be readily apparent that many minor changes of structure and operation could be made without departing from the spirit of the invention.

What I claim as new and desire to protect by Letters Patent is:

1. A screw and a pair of screwdrivers therefor, said screw having a shank and an enlarged head concentric with said shank, said head having a substantially annular socket formed in the outer end therof, coaxially with the screw shank, leaving a cylindrical center post coaxial with said screw and a pair of integral radial walls extending from said center post to the outer periphery of said socket, said radial walls having relatively thick sections spaced equally from the screw axis, and relatively thin sections also spaced equally from the screw axis but at a distance therefrom different from said relatively thick sections, said relatively thin sections being weakened along at least some of their lines of connection to said screw head, center post and relatively thick wall sections, said screwdrivers each having an elongated shank having an axial socket engageable over said center post and a slot formed diametrically in its socketed end and engageable over said radial walls, and being similar except as to size, the socket walls of the first of said screwdrivers being of such diameter that the slots thereof engage said relatively thin wall sections, and the socket walls of the second of said screwdrivers being of such diameter that the slots thereof engage said relatively thick wall sections.

2. The combination as recited in claim 1 wherein the outer wall of said screw head socket is also cylindrical coaxially with said screw, and wherein the relatively thin sections of said walls are relatively closer to said center post than said relatively thick wall sections, the socket of said first driver being sized to engage slidably and rotatably around said center post, and the socket walls of said second driver being externally sized to engage slidably and rotatably in said screw head socket in engagement with the outer wall thereof, whereby both said first and second drivers are maintained in coaxially centered relation to said screw to engage only their properly associated wall sections.

3. The combination as recited in claim 2 wherein the shank walls surrounding the end sockets of said first and second drivers are slightly resilient, and are sprung, respectively, slightly inwardly and outwardly, whereby to grip and support said screw frictionally, the socket walls of said first driver engaging said center post, and the socket walls of said second driver engaging the outer wall of said screw head socket.

* * * * *